(12) United States Patent
Flegel et al.

(10) Patent No.: US 6,327,827 B1
(45) Date of Patent: Dec. 11, 2001

(54) FLAT STRUCTURAL MEMBER, PARTICULARLY A CAST METAL PART OR A CAST PLASTIC PART AND A METHOD FOR MAKING THE SAME

(75) Inventors: Heinrich Flegel, Aidlingen; Wolfgang Fussnegger, Tuebingen; Martin Klamser, Grafenau; Stefan Lotz, Herrenberg; Bruno Moeltgen, Tiefenbronn; Volker Thoms, Claw, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/303,432

(22) Filed: May 3, 1999

(30) Foreign Application Priority Data

May 2, 1998 (DE) .............................. 198 19 697

(51) Int. Cl.[7] .............................. F16S 1/10; B62D 25/10; B62D 29/04
(52) U.S. Cl. .................. 52/309.13; 52/309.3; 52/796.1; 52/735.1; 180/69.2; 296/76; 296/901
(58) Field of Search ................... 52/783.1, 789.1, 52/796.1, 735.1, 738.1, 309.3, 309.13; 180/69.2, 69.21; 296/76, 901

(56) References Cited

U.S. PATENT DOCUMENTS

| | | | |
|---|---|---|---|
| 851,343 | * | 4/1907 | Caldwell .............................. 52/796.1 |
| 3,935,353 | * | 1/1976 | Doerfling et al. ............... 296/901 X |
| 4,174,994 | * | 11/1979 | Savelkouls ............................ 156/389 |
| 4,718,214 | * | 1/1988 | Waggoner ...................... 52/309.13 X |
| 5,124,191 | * | 6/1992 | Seksaria .......................... 52/789.1 X |
| 5,417,022 | * | 5/1995 | Ritchie ............................. 52/309.13 |
| 5,762,359 | * | 6/1998 | Webber et al. ................... 280/728.2 |
| 6,073,991 | * | 6/2000 | Naert ................................ 296/901 X |
| 6,248,408 | * | 6/2001 | Lee ........................................ 427/475 |

FOREIGN PATENT DOCUMENTS

| | | | |
|---|---|---|---|
| PS 717 467 | | 1/1942 | (DE) . |
| 1434824 | * | 12/1968 | (DE) .................................. 52/738.1 |
| 35 28 118 A1 | | 2/1987 | (DE) . |
| 43 23 178 A1 | | 1/1995 | (DE) . |
| 195 08 421 A1 | | 9/1996 | (DE) . |
| 565053 | * | 10/1944 | (GB) .................................. 52/796.1 |
| WO 96/12638 | * | 5/1996 | (WO) . |

OTHER PUBLICATIONS

Plumb, Stephen E., "Material World, SAE '89 Congress showcases goods, goodies", Ward's Auto World, pp. 95–96.*

* cited by examiner

Primary Examiner—Laura A. Callo
(74) Attorney, Agent, or Firm—Crowell & Moring LLP

(57) ABSTRACT

A flat cast structural member, particularly a cast metal part or a cast plastic part wherein the surface of the structural member is covered by a thin metal sheet or a plastic layer. An adhesive or coupling layer is provided between the thin metal sheet or plastic layer, whereby under the influence of heat, the adhesive or coupling layer absorbs any surface unevenness or irregularities on the structural member.

8 Claims, 1 Drawing Sheet

FLAT STRUCTURAL MEMBER, PARTICULARLY A CAST METAL PART OR A CAST PLASTIC PART AND A METHOD FOR MAKING THE SAME

BACKGROUND AND SUMMARY OF THE INVENTION

This application claims the priority of DE 198 19 697.0-24, filed May 2, 1998, the disclosure of which is expressly incorporated by reference herein.

In automobile construction, it is frequently desirable to provide flat structural members, such as rear lids or engine hoods, as cast metal or plastic parts. As a result, weight can be saved in contrast to the use of conventional sheet metal parts. However, it is a problem in this case that flow marks and surface irregularities occur because of the material flow during the casting process. In addition, the varying solidification of the materials in the case of fluctuating wall thicknesses as well as with respect to possibly provided ribbings, results in considerable sink marks. Up to now, this surface unevennesses on flat structural members had to be removed, usually manually, in a cutting manner.

German Patent Document DE 43 23 178 A1 discloses a supporting vehicle body part made of aluminum and constructed as a cast part. The cast part provides supporting functions and absorbs introduced forces, in which case the vehicle body part is permanently connected with aluminum sheets. Here, the vehicle body part has a massive ribbing made of aluminum which is constructed as a diecast part. In this case, the ribbings have an essentially three-dimensional construction so that the considerations on which the present invention is based, specifically the disadvantages caused by flow marks and surface irregularities occurring during the casting of the metal parts, play no role.

German Patent Document DE 35 28 118 A1 discloses a vehicle body part for motor vehicles, particularly an engine hood, to obtain a construction which is modified with respect to a serial product.

For this purpose, it is contemplated to use the serial product as a support for a plastic part which determines the modified shape, particularly made of a fiber-reinforced material and is connected with the serial product, preferably glued to it. In this case, the plastic part can be connected with the serial part at least on its circumference. The difficulties, on which the present invention is based, which occur in the case of flat cast metal parts, play no role in the case of such an arrangement.

Finally, it is known from German Patent Document DE-PS 717 467 to use synthetic resin foils on a metal base while using synthetic resin as an adhesive. This document also does not relate to flat cast metal parts.

It is an object of the present invention to avoid the disadvantages, particularly the necessity of a manual cutting, which occur in the case of cast metal parts or cast plastic parts because of surface unevennesses.

This and other objects are achieved by a flat cast structural member that is covered with a thin metal sheet or plastic layer.

According to the invention, the surface unevenness which occurs during the casting process of cast metal parts or cast plastic parts and which are, for example, the result of the varying solidification rates of the material, can be avoided. By covering the surface of the flat structural member with a thin metal sheet or a plastic coating, it will now no longer be necessary to manually work out surface unevennesses, ribbings, etc.

Advantageous embodiments of the invention are the object of the subclaims.

According to an advantageous further development, the flat structural part is constructed as a cast magnesium part. Cast magnesium parts have a low weight and can be used advantageously in automobile construction.

According to another advantageous embodiment, the flat structural member is constructed as a ribbed fiber-reinforced plastic part (FVK). Materials of this type can be used particularly advantageously in the automobile field for rear lids, engine hoods and fenders. As the result of the covering according to the invention, it is possible in a simple manner to cover sink marks occurring on material suspensions.

The thin metal sheet may advantageously be a steel or aluminum sheet. Such sheets are available at a reasonable price and are of relatively low weight.

The adhesive or coupling layers, under the influence of heat, absorb the expansions of the structural members. As used herein, absorb means to compensate for surface unevenness and irregularities. As a result, particularly the long-term stability of the cast metal part according to the invention can be improved.

The adhesive or coupling layers, under the influence of heat, absorb the expansions of the structural members. As used herein, absorb means to compensate for surface unevenness and irregularities As a result, particularly the long-term stability of the cast metal part according to the invention can be improved.

Other objects, advantages and novel features of the present invention will become apparent from the following detailed description of the invention when considered in conjunction with the accompanying drawings.

BRIEF DESCRIPTION OF THE DRAWINGS

Preferred embodiments of the invention will now be described by means of the enclosed drawing.

DETAILED DESCRIPTION OF THE DRAWINGS

Figure 1:
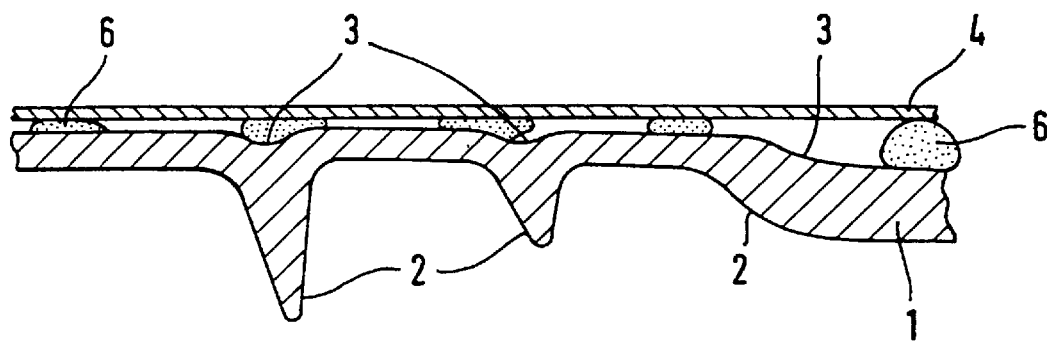
FIG. 1 is a view of a first embodiment of a the present invention, in the case of which a cast magnesium part is covered with a thin, drawn sheet metal part.

FIG. 1 is a schematic view of a covering according to the present invention. A cast magnesium part 1 is covered with a thin steel or aluminum sheet part 4. Although thin steel or aluminum is disclosed here, other materials are also contemplated which would not significantly change the desired effect. It is illustrated that the cast magnesium part 1 has ribbings 2 as well as sink marks or surface irregularities 3. Such surface irregularities 3 occur in the case of fluctuating wall thicknesses because of the varying solidification of the material and with respect to ribbings 2. For covering these surface irregularities 3, the thin steel or aluminum sheet part 4 is adhered by means of suitable adhesives, in the illustrated example, by means of adhesive beads 6, onto the flat cast magnesium part 1. The adhesive beads 6 provide an adhesive or coupling layer between the cast magnesium part 1 and the steel or aluminum sheet 4, which adhesive or coupling layer, under the influence of heat, can absorb the expansions of the respective materials.

Figure 2:
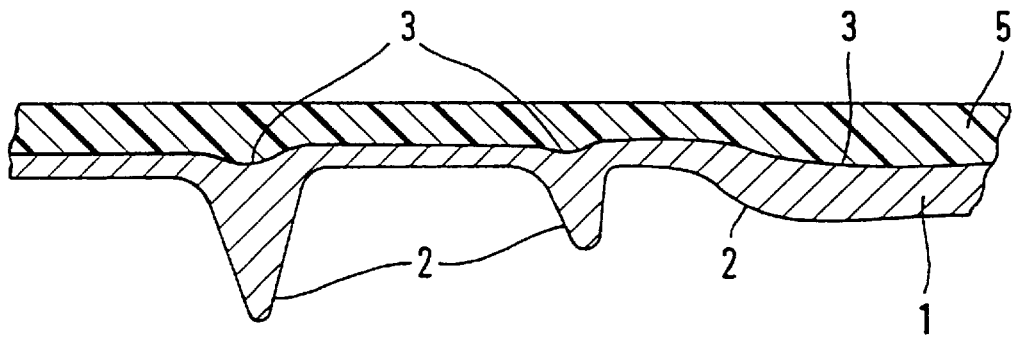
FIG. 2 is a view of another embodiment of the present invention, in the case of which a cast magnesium part is covered with a plastic layer.

Another further development of the invention is illustrated in FIG. 2. This figure again shows a flat cast magnesium part 1 with ribbings 2 and sink marks or surface irregularities 3. For covering the surface irregularities 3, a plastic layer 5 is provided and is adhered by means of suitable adhesives, which are not shown in detail, to the surface of the cast magnesium part 1 having the surface irregularities 3.

By covering the surfaces of the cast magnesium part with thin metal sheets 4 or plastic layers 5, it is possible in a simple manner to achieve surfaces of the highest quality without the requirement of manually working the flat structural members. In comparison to conventional structural steel members, the weight of the structural member can be reduced by up to 40% by the covering according to the invention with drawn thin steel or aluminum sheets or thin plastic layers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A flat cast structural member comprising a cast metal or plastic part,
   wherein a surface of the structural member is covered with a plastic layer to provide the structural member with a substantially smooth surface,
   wherein the structural member is configured in the form of a structural member of a motor vehicle.

2. A flat cast structural member according to claim 1, wherein the structural member is a cast magnesium part.

3. A flat cast structural member according to claim 1, wherein the structural member is a ribbed, fiber-reinforced plastic part.

4. A flat cast structural member according to claim 1, wherein at least one layer of adhesive is provided between the cast structural member and the plastic layer.

5. A flat cast structural member according to claim 1, wherein the structural member of the motor vehicle is a hood or a trunk.

6. A flat structural member comprising:
   a cast structural member having a surface with unevenness or irregularities;
   a covering placed on the surface of the structural member, the covering being a plastic layer positioned on the structural members so as to substantially remove the unevenness or irregularities.

7. A covered flat cast structural member comprising:
   a flat cast metal structural member comprising a surface; and
   a plastic layer arranged to cover the surface of the flat cast metal structural member so as to substantially remove any unevenness or irregularities formed on the surface.

8. A flat structural member comprising:
   a cast structural member having a surface with unevenness or irregularities; and
   a covering placed on the surface of the structural member, the covering being a plastic layer positioned on the structural members so as to substantially remove the unevenness or irregularities;
   wherein the structural member is configured in the form of a motor vehicle structural member selected from the group consisting of a hood and a trunk.

* * * * *